United States Patent
Kiyanda et al.

(10) Patent No.: US 11,329,933 B1
(45) Date of Patent: May 10, 2022

(54) PERSISTING AN AI-SUPPORTED CONVERSATION ACROSS MULTIPLE CHANNELS

(71) Applicant: Drift.com, Inc., Boston, MA (US)

(72) Inventors: Bernard N. Kiyanda, Mansfield, MA (US); Jeffrey D. Orkin, Arlington, MA (US); Christopher M. Ward, Somerville, MA (US); Elias Torres, Belmont, MA (US)

(73) Assignee: Drift.com, Inc., Boston, MA (US)

( * ) Notice: Subject to any disclaimer, the term of this patent is extended or adjusted under 35 U.S.C. 154(b) by 0 days.

(21) Appl. No.: 17/135,005

(22) Filed: Dec. 28, 2020

(51) Int. Cl.
*H04L 51/02* (2022.01)
*G10L 15/183* (2013.01)

(52) U.S. Cl.
CPC ............ *H04L 51/02* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 10,818,293 B1 | 10/2020 | Orkin et al. | |
| 2007/0043574 A1 | 2/2007 | Coffman et al. | |
| 2012/0137367 A1* | 5/2012 | Dupont | G06F 21/00 726/25 |
| 2014/0089348 A1 | 3/2014 | Vollmert | |
| 2017/0187771 A1 | 6/2017 | Falcon | |
| 2018/0083894 A1 | 3/2018 | Fung et al. | |
| 2018/0121415 A1* | 5/2018 | Perez | G10L 15/08 |
| 2018/0278552 A1* | 9/2018 | Quock | G06Q 20/384 |
| 2018/0308476 A1* | 10/2018 | Hirzel | G06F 40/35 |
| 2018/0322403 A1* | 11/2018 | Ron | H04L 51/02 |
| 2019/0394147 A1 | 12/2019 | Rodriguez et al. | |
| 2020/0134018 A1* | 4/2020 | Laxman | G06F 40/30 |
| 2020/0153918 A1 | 5/2020 | Laird-McConnell et al. | |
| 2020/0329144 A1* | 10/2020 | Morgan | G06N 3/006 |
| 2020/0349614 A1 | 11/2020 | Batcha et al. | |
| 2020/0351403 A1 | 11/2020 | George et al. | |

OTHER PUBLICATIONS

Wikipedia, "Omnichannel," at least as early as Dec. 5, 2020.
Orkin, Jeffrey David, "Collective artificial intelligence: simulated role-playing from crowdsourced data," Doctoral Thesis, Massachusetts Institute of Technology, Feb. 2013.

* cited by examiner

*Primary Examiner* — Richa Mishra
(74) *Attorney, Agent, or Firm* — David H. Judson (57) ABSTRACT

A method and computing platform to imitate human conversational response as a context transitions across multiple channels (e.g., chat, messaging, email, voice, third party communication, etc.) where inputs to the system are categorized into identified speech acts and physical acts, and a conversational bot is associated to the channels. In this approach, a data model associated with a multi-turn conversation is provided. The data model comprises an observation history, wherein an observation in the observation history includes an identification of a channel in which the observation originates. As turns are added to the multi-turn conversation, a conversational context across multiple channels is persisted using the data model. Using this approach, an AI-supported conversation started in one channel can move to another conversation channel while maintaining the context of the conversation intact and coherent.

17 Claims, 6 Drawing Sheets

```
"context" : {
    "orgId" : "<orgId>",
    "conversationId" : "<conversationId>",
    "endUser" : {
        "id" : <endUserId>,
        "type" : "LEAD",
        "attributes" : { },
        "orgId" : <orgId>
    },
```

```
"context" : {
    "orgId" : "<orgId>",
    "conversationId" : "<conversationId>",
    "endUser" : {
        "id" : <endUserId>,
        "type" : "LEAD",
        "attributes" : { },
        "orgId" : <orgId>
    },
```

502

```
"message" : {
    "conversationId" : "<conversationId>",
    "id" : <messageId>,
    "createdAt" : <messageCreatedAt>,
    "type" : "CHAT",
    "body" : <messageBody>,
    "authorType" : "LEAD"
    "contentType" : "CHAT",
    "conversationEvent" : null,
    "authorId": <endUserId>,
    "orgId" : <orgId>,
    "attributes" : {
        "buttonClicked" : false
    }
}
}
```

PERSISTING AN AI-SUPPORTED CONVERSATION ACROSS MULTIPLE CHANNELS

BACKGROUND

Technical Field

This application relates generally to information retrieval methods and systems.

Background of the Related Art

The rise of smartphones, messaging, video streaming, artificial intelligence (AI), and a host of other innovations has led to a total transformation in the way people search for and purchase products. As a result, the traditional marketing playbook is quickly becoming obsolete. If today's marketers want to achieve success in the long-term, they need to adapt. Over the past decade, marketers have gotten too comfortable using the same three channels: blogging, email, and social. And while these channels, when used properly, can still drive results, a lot of marketing teams are seeing diminishing returns.

To address this problem, customer lifecycle marketing is a strategy that businesses use to prevent customers from reaching the end of their journey, and instead, aims to function as a continuous loop that gets customers to continue their relationship with a brand. The customer lifecycle is a term used to describe the different steps a customer goes through as they learn about a product, make a purchasing decision, and remain loyal to a particular brand. Customer lifecycle marketing is a marketing strategy that involves studying the whole customer journey on a holistic level, moving from the first point of contact, nurturing leads through the buying cycle, then post-purchase focuses on deepening the relationship to ensure long-term loyalty and repeat purchases. Customer lifecycle marketing is designed to work across multiple platforms and channels, and it is designed to approach marketing across the entire customer journey.

Marketing automation is the practice of using software to execute, manage and automate marketing tasks and processes. Marketing automation software is a kind of technology that businesses use to manage their marketing processes and campaigns across multiple channels. Among other things, it also allows companies to contact prospects and customers with automatically delivered messages that are sent across email, a web browser, or otherwise. Automation platforms of this type also now take advantage of Artificial Intelligence (AI)-based technologies. One such example is Conversational AI, such as available from Drift.com, Inc., of Boston, Mass. Drift's conversational AI is trained on a large number of conversations to identify the patterns that engage and convert visitors into qualified pipeline. Drift's AI bot answers your customers' questions in the best way, and it learns from all of these conversations over time to identify what is and is not working so that enterprise can adjust their sales and marketing messaging, assets, strategies and more.

As further background, the notion of omnichannel refers to cross-channel content strategies that organizations use to improve their user experience and drive better relationships with their audience across different points of contact with the organization. In this approach, and in lieu of working in parallel, communication channels and their supporting resources are designed and orchestrated to cooperate. In the conversational bot context, an omnichannel solution involves creating one bot that can converse with the same dialogue content over different channels. The approach enables the organization to reuse content across multiple channels, simplifying content management.

Although AI-supported marketing automation technologies, platforms and services provide significant advantages, there remains a need to enhance these solutions, and to facilitate their integration into customer lifecycle marketing-based strategies and other products and services.

BRIEF SUMMARY

A method and computing platform to imitate human conversational response as a conversational context transitions across multiple channels (e.g., chat, messaging, email, voice, third party communication, etc.) where inputs to the system are categorized into identified speech acts and physical acts. A speech act is a labeled grouping of utterances, and a physical act is a non-linguistic action taken by an actor. In this approach, a data model associated with a multi-turn conversation is provided. The data model comprises an observation history, wherein an observation in the observation history includes an identification of a channel in which the observation originates. The channel is one of a set of input and output channels. As turns are added to the multi-turn conversation, a conversational context across multiple channels is persisted using the data model. Using this approach, an Artificial Intelligence (AI)-supported conversation started in one channel can move to another conversation channel while maintaining the context of the conversation intact. Because the conversional context is embedded in the data model, by saving the data model persistently, channel changes are recognized even long after a particular interactive session (e.g., a chat) terminates. In one embodiment, and by enabling multiple channels to share the same conversational context, entities (e.g., such as distinct marketing and sales groups) within an organization are enabled to use their most effective channels for them and at different stages (e.g., lead, sales, etc.) of a customer lifecycle, as well as to benefit from other process/task automation that is channel-based.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

The techniques of this disclosure facilitate the persisting of AI-based conversations across multiple channels. The following is a glossary of terms that are used herein:

Channel: a communications protocol that is defined by a set of requests, responses, header fields, message fields including a message body, and other behaviors depending on the specific protocol. A channel enables interactions between different parties (or entities) and that take place in a series of independent message exchanges, typically consisting of a request and any responses to that request. Communication protocols can be proprietary, or defined by a set of public standards (e.g., email). Chat or messaging, email, voice and SMS are channels that use different communication protocols.

Event: a sequence of observations, recognizable as a coherent behavior. Observations within the sequence can be an arbitrary mix of speech acts and physical acts, from multiple actors. One event can be represented by many different possible expressions of that event.

Event expression: one specific sequence of one or more observations that can represent some event. An event may unfold in many different ways, i.e., there may be many different sequences of saying things, and taking physical actions.

Event recognition: inferring which event is unfolding, or has unfolded, by comparing a sequence of observations to sequences that compose the expressions for some event.

Event aliasing: inferring which event is unfolding, or has unfolded, with an inexact match. When an exact sequence is not recognized, a closest inexact match can be determined and presented as an alias such that further processing can then be performed as if the closest inexact match was recognized as a known sequence.

Observation: an atomic action taken by an actor. Each action may be a physical act or a speech act. One or more observations may be intermingled between or among events as the events unfold in parallel, in which case the events themselves are active (in time) concurrently. Each observation is a member of one event, but as noted events can overlap in time, e.g., given observations 1-4, observations 1 and 3 may be part of event 1, while observations 2 and 4 may be part of event 2, such that events 1 and 2 are both active over a time period. As this example shows, observations from different events may be arbitrarily sequenced among observations from other events.

Physical act: a non-linguistic action taken by an actor, e.g., clicking a button or a link on a Graphical User Interface (GUI), entering data in a form, or the like. A physical act also may be received via more sophisticated data entry mechanisms, such as a gesture-based interface that reads and interprets facial expressions, biometric devices that receive and interpret physical features or movements, etc.

Speech act: an utterance expressed by one actor to another, in natural language. A speech act has some purpose for expressing it, and typically it can be expressed in many different ways to accomplish the same thing. The utterance may be typed text (e.g., in a chat window), transcribed from spoken audio, or the like.

Utterance: a sequence of words that is grammatically complete; usually one sentence.

Multi-turn conversation: typically, an interaction between multiple human actors, or an interaction between an end user participating in a chat, and a conversational bot, typically over multiple question and answer cycles. A multi-turn conversation may involve more than one human user, and more than one bot. For example, a bot may be configured to talk to multiple users concurrently (e.g., participants in a Zoom® web conference). Generalizing, a multi-turn conversation can be from human-human, or human-bot conversations, including a mix thereof. Conversations may derive from multiple and disparate data sources, such as voice calls, conversational bots, web-based conferencing, and so forth.

Figure 1:
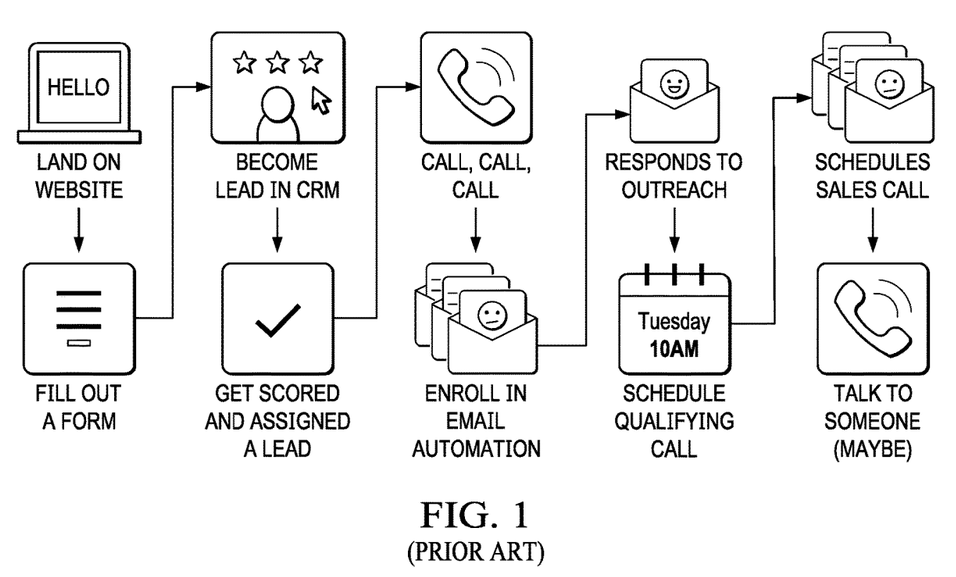
FIG. 1 depicts a typical marketing workflow involving multiple communications channel.

FIG. 1 depicts a prior art marketing and sales workflow that illustrates the notion of multiple channels, but where the channels are not necessarily integrated in the manner as will be described below. As depicted, a hypothetical user firsts lands on a website and fills out a form with his or her contact information. Based on the information submitted, the user becomes a lead in a customer relationship management (CRM) system. That system may then score the lead and assign it for follow-up. Thereafter, one or more automated calls are placed to attempt to contact the lead. If the user is reached, he or she is then asked to enroll in an email automation system, e.g., by providing an email address. Thereafter, the user is contacted by email, and he or she may then respond to that outreach and agree to take a qualifying call. The call is then scheduled, and then finally the user ends up speaking with a human being. One or more of these interactions are facilitated by marketing automation, but the overall interaction can often prove unsatisfactory, and thus the workflow is often of limited success.

Figure 2:
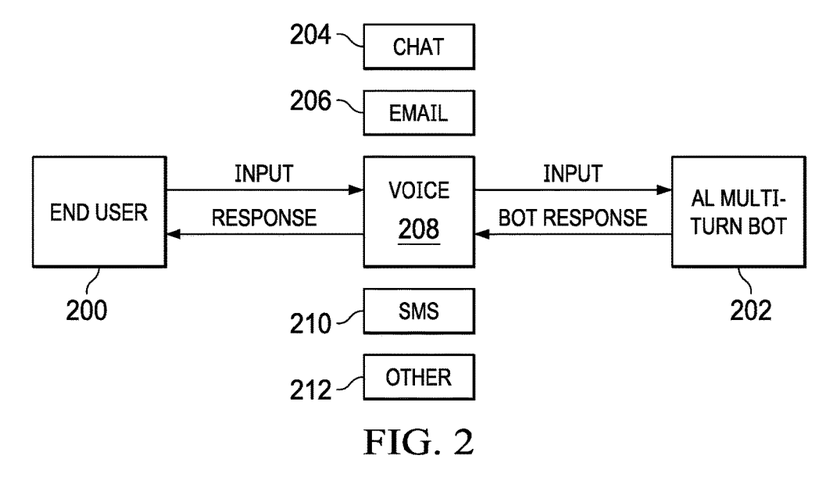
FIG. 2 depicts an end user interacting with an AI multi-turn conversational bot through a set of channels.

FIG. 2 depicts an end user 200 interacting with an AI multi-turn conversational bot 202 through one or more channels that include: chat 204, email 206, voice 208, SMS 210, and others 212. Depending on implementation, the channels are integrated with the conversational bot by one or more mechanisms, such as Application Programming Interfaces (API), software libraries, interfaces from third party providers, and the like, and the solution (or any portion(s) thereof) may also be performed as a standalone service. Typically, channels have two or more parties involves in a communication, namely, one or more end users (such as end user 200), and the conversational bot 202. Thus, and as depicted, typically the conversational bot 202 is a participant and thus is conversing over each of the separate channels. When an end user 200 wants to start a conversation, the end user initiates a request (an input) to a channel. The channel then sends an associated request (e.g., to a back-end server associated with the multi-turn conversational bot) to establish a session. Typically, the first request establishes a session, and subsequent requests occur with the same session. During the session, the communication protocol provides an exchange of requests and responses containing the messages between the end user 200 and the AI multi-turn conversational bot 202. The session usually is terminated when the end user or the bot ends the conversation. In this example, scenario, there is a single instance of the multi-turn conversational bot, but this is not a limitation, as there may be multiple instances of the bot. Stated another way, preferably there is a conversational bot (and typically a multi-turn one) on all channels.

With the above as background, the techniques of this disclosure are now described.

Persisting an AI-Supported Conversation Across Multiple Channels

As noted above, the techniques herein facilitate a multi-turn conversation that persists between (or, more generally, among) multiple channels. As noted above, a channel is the input/output that is used to converse in a multi-turn conversation, and each channel is a AI-supported, e.g., by employing the multi-turn conversational bot, or the like. In the context of this disclosure, and as depicted in FIG. 2, during the session an end user starts a conversation with the multi-turn conversational bot in one channel, and then continues that same conversation across a second, different channel. Notwithstanding the channel switch, however, and according to this disclosure, the context of the conversation remains entirely intact and coherent. As will be seen, this coherency is maintained irrespective of the channels being switched using a same multi-turn conversation data model for the conversation and that persists a conversational context.

Figure 3:
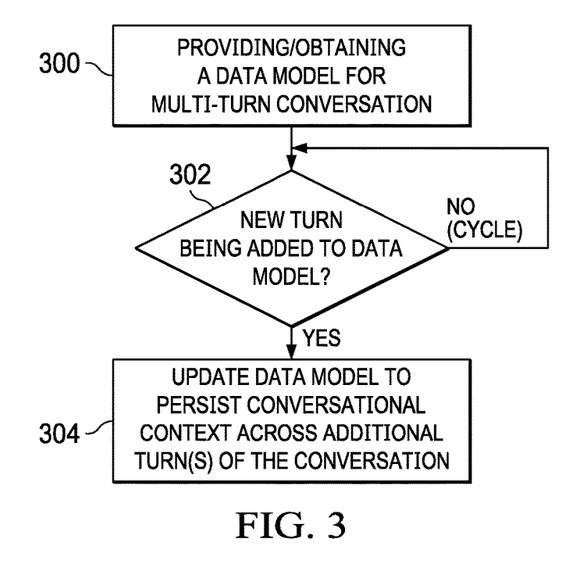
FIG. 3 depicts a high level process flow of a multi-channel AI-supported conversational technique of this disclosure.

According to one embodiment, and as depicted in the process flow shown in FIG. 3, a method to imitate a human conversational response across multiple channels is provided, and wherein each channel is operating in association with a multi-turn conversational bot in the back-end as depicted in FIG. 2 As noted above, there may be one or more instances of the multi-turn conversational bot executing, in which case the instances also share the data model. In this approach, typically inputs to the system are categorized into identified speech acts and physical acts, wherein a speech act is a labeled grouping of utterances, and wherein a physical act is a non-linguistic action taken by an actor. Although not intended to be limiting, one approach to categorizing inputs in this manner may take advantage of a set of conversations that have been annotated to identify the speech and/or physical acts. Other approaches that may be used to identify speech (for example) include, without limitation, keyword spotting to classify each utterance input, and training a classifier for speech acts.

The method begins at step 300 by providing a data model associated with a multi-turn conversation, where the data model comprising an observation history. According to an aspect of this disclosure, an observation in the observation history includes an identification of a channel in which the observation originates, and wherein the channel is one of a set of input and output channels such as described above. In one embodiment, the data model is sourced from a set of saved data models that are being stored in the system and, in particular, by determining whether a received input to the system can be located in the data model. After providing (or otherwise obtaining) the data model, the method continues at step 302 to evaluate whether a turn is being added to the multi-turn conversation. In the context of this disclosure, this determination is channel-agnostic. The data model itself preferably is associated with an end user identifier (typically corresponding to a unique address/reference), and this enables the association of the data model that represents the multi-turn conversation, thereby facilitating the capability to persist the data model and thus the conversation over multiple channels. Referring back to FIG. 3, if the outcome of the test at step 302 is negative, the routine cycles, as shown. If, however, a turn is being added to the multi-turn conversation, the method continues at step 304 to use the data model to persist a conversational context across multiple channels, each of which are associated to the multi-turn conversational bot instance(s). To this end, step 304 typically involves updating the data model to include information about the new turn.

Figure 4:
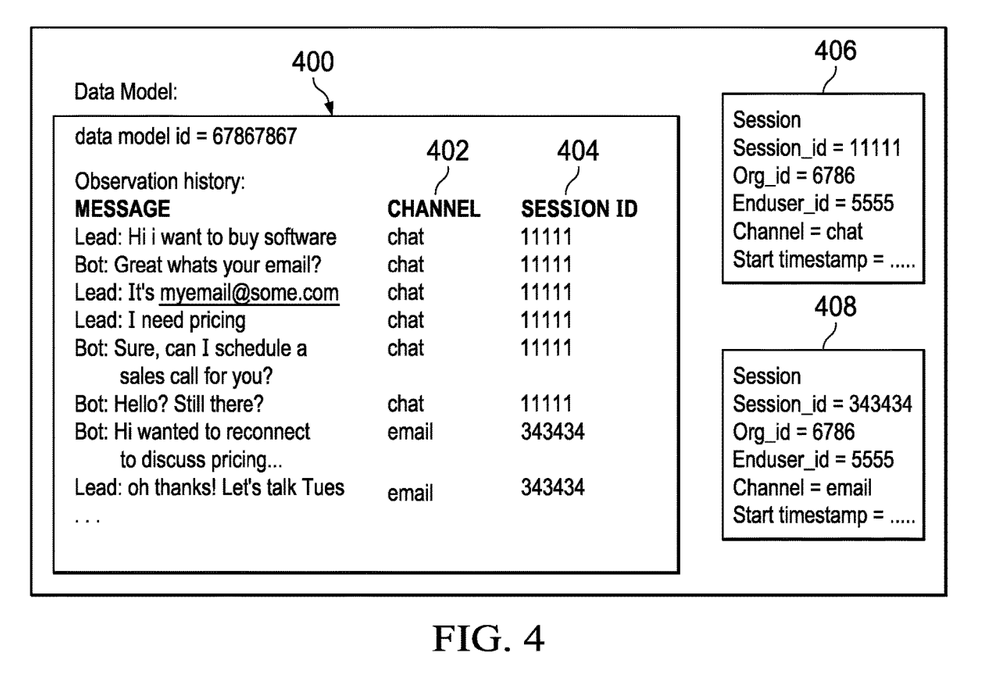
FIG. 4 depicts how a data model is persisted according to this disclosure to facilitate a multi-turn AI conversation between or among multiple channels.

FIG. 4 depicts a representative data model 400. As depicted, the data model 400 includes an observation history, with each observation associated with a channel (CHANNEL) 402, and a session identifier (SESSION ID) 404. In this example, which is not intended to be limiting, there are several sessions, namely, a first session (Session_id=1111) 406, and a second session (Session_id=343434) 408. As depicted, each session also includes an organization identifier, and end user identifier, a channel identifier, and a start timestamp. The channel identifier identifies the originating channel, in this example "chat" for the first session 406, and "email" for the second session 408. As can be seen, the data model 400 records each observation (a separate row), identifying the observation itself, as well as the originating channel and the session identifier. As the data model is updated for each turn, the channel specification(s) are included. In this manner, and as noted above, the particular conversational context is persisted as the conversation with the multi-turn conversational bot instance(s) moves between or among multiple different channels (in this case, chat and email).

Figure 5A:
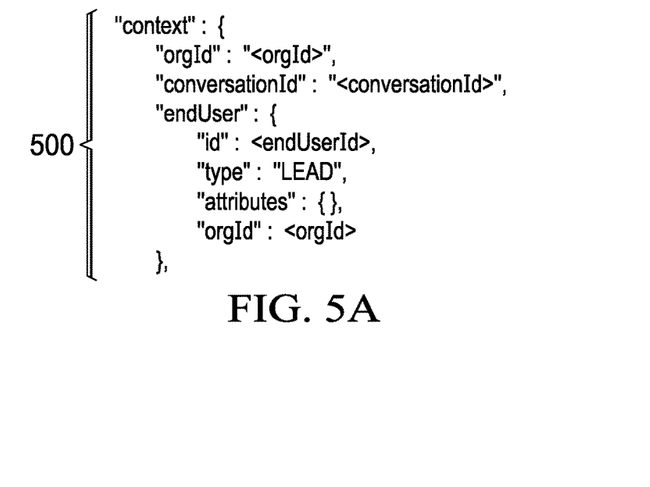
FIG. 5A depicts a representative internal system data structure for a content object that may be used to maintain a unique conversation identifier.

To facilitate multiple channels sharing the same conversational context, preferably the system generates and maintains data structures (context objects) that include the relevant information elements and their values. FIG. 5A depicts a representative context object 500, where "context" corresponds to the session identifier as noted above in the data model shown in FIG. 4. As depicted, the context object includes a conversation identifier ("conversationId"), which typically is a unique string that corresponds to a particular conversation that is to be maintained across turns in a multi-turn conversation, an organization identifier ("orgId"), which typically corresponds to a particular organization or organization entity, an end user identifier ("endUser"), which corresponds to the end user and thus the data model. One or more other information elements may be associated with the end user, such as "type," "attribute(s)," "orgId" and the like. In this example, the conversationID uniquely identifies the conversational context of the conversation. This data structure format and syntax are not intended to be limited. Generalizing, the information element that includes the conversational context may be any context object.

Figure 5B:
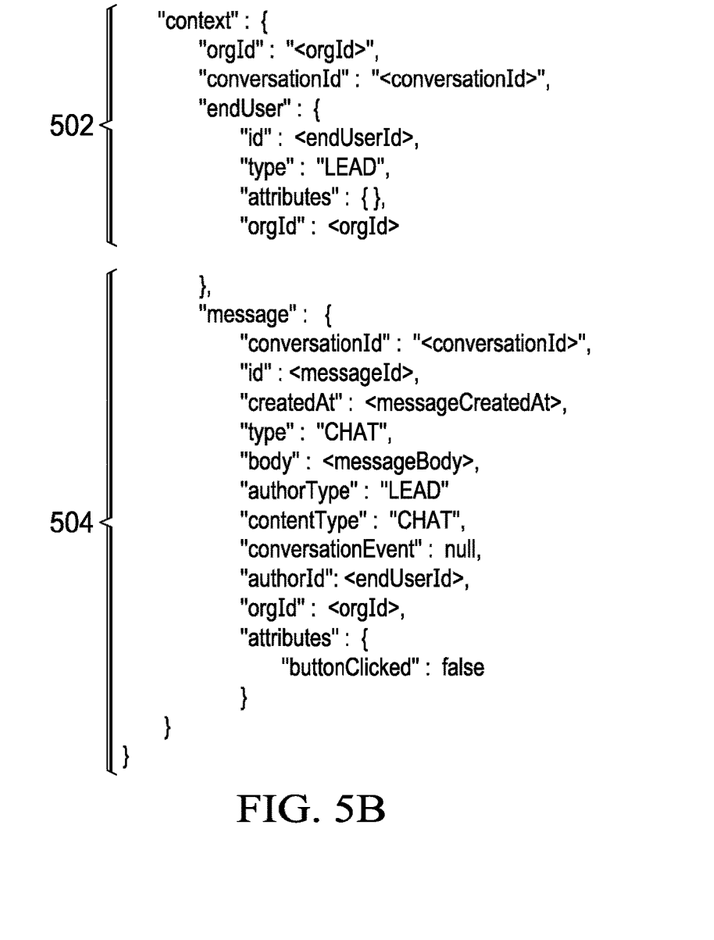
FIG. 5B depicts representative data structure for a portion of a multi-turn conversation according to this disclosure.

FIG. 5B further depicts how the data structure in FIG. 45A is used to maintain conversational context. In this example, the "context" object 502 carries the conversation identifier that uniquely identifies the conversational context, as previously described. As also shown, the data structure also includes the "message" information element 504, which corresponds to a row in the data model shown in FIG. 4. This information element includes a message identifier ("messageId") and various related elements such as a "messageCreatedAt" element (e.g., a timestamp), and a "messageBody" (e.g., the text of an end user's response). Of course, the particular values depicted here are merely for illustration.

As noted above, in a multi-turn use case, a turn typically captures all consecutive utterances from a given (same) conversational entity. Typically, at least some of the conversations in the first and second sets are derived from one of: a human-to-human interaction, and a human-to-conversational bot interaction. A three-way interaction (human-to-bot-to-second human) may also be captured.

The following are several example customer lifecycle marketing scenarios for multi-channel AI-support conversational support according to this disclosure.

In a first scenario, an end user starts an AI-based conversation with the system, using the bot conversing over text-based chat. As noted, the system maintains the context of the multi-turn conversation, e.g., using a context object that includes the internal conversational identifier. During the chat conversation, assume that the end user provides a mobile number (SMS). This new channel definition is then added to the context object. When transitioning from one channel to another (e.g., chat to SMS, SMS to chat, email to chat, etc.) the user can continue the same AI-supported multi-turn conversation that was initiated from of the other channels and, in particular, by the system updating the data model in the manner described above (i.e., maintaining the conversational (context) identifier). As a concrete example, assume now that the AI-conversation in progress transitions from chat to SMS for the same end user, and wherein the transition is initiated either by the system or the end user. The same AI conversation that was initiated in the first channel resumes and continues in the second channel, and thus the multi-turn conversion continues. The context is persisted using the data model (as updated across the turn). There is no restriction on the number of transitions between or among channels for a given context. Indeed, preferably there is also no "time-out" of a particular data model after which it is no longer possible to associate a new turn to the multi-turn conversation. Rather, preferably a data model is saved in the system indefinitely and can be indexed and retrieved on-demand so as to facilitate adding another turn.

In a second scenario, the system initiates a conversation with an end user, e.g., via an email campaign. In this example, assume that the end user either can reply to the email, or he or she can instead click a link in the email that then opens a chat bot conversation on a web page that continues where the email leaves off. There may be multiple interactions (back and forth) over email before the chat bot conversation occurs.

In another scenario, an end user starts an AI-based conversation with a chat bot on the platform, and eventually the end user provides an email address. In this example, some period of time has passed after the user stops responding to the bot via text chat. Nevertheless, and by maintaining the original data model, the system later transitions the same multi-turn conversation, but now using email.

In still another scenario, the end user starts an AI-based conversation with a third party IVR, and eventually the end user provides the IVR a mobile phone number. This information is made available to the AI-supported platform, which then transitions the same multi-turn conversation to using SMS.

Of course, the above examples are merely representative, and there may be multiple other types of permutations across the various platform-supported communications channels. Still another variant scenario is where a user does connect to a human sales representative, and the AI-based conversational bot follow-up occurs later, possibly answering a question that remain unanswered in the original conversation, or perhaps reminding the user to follow through on some promised next step.

According to several further features, preferably the AI-conversation is selectively adapted based on awareness of what channel it is currently communicating on. In this aspect, the system determines (or has other awareness) of the channel and adapts its interaction(s) with the user accordingly. In an example, assume the channel in use is SMS. Because on SMS it may not be possible to present the user button options the system omits buttons and/or rephrases a current query to the user. In another aspect, the system recognizes that a particular turn (conversation) includes some attribute that may be set in one channel and then re-used or re-purposed in a second channel. In this aspect, the system obtains the value of an attribute (e.g., an email address), thereby obviating having to re-request that information when the channel transition occurs. As a concrete example, assume a conversation starts on email and then transitions to text chat. In this case, the bot does not need to ask for the user's email address because the system already knows it from the originating email.

Enabling Technologies

Figure 6:
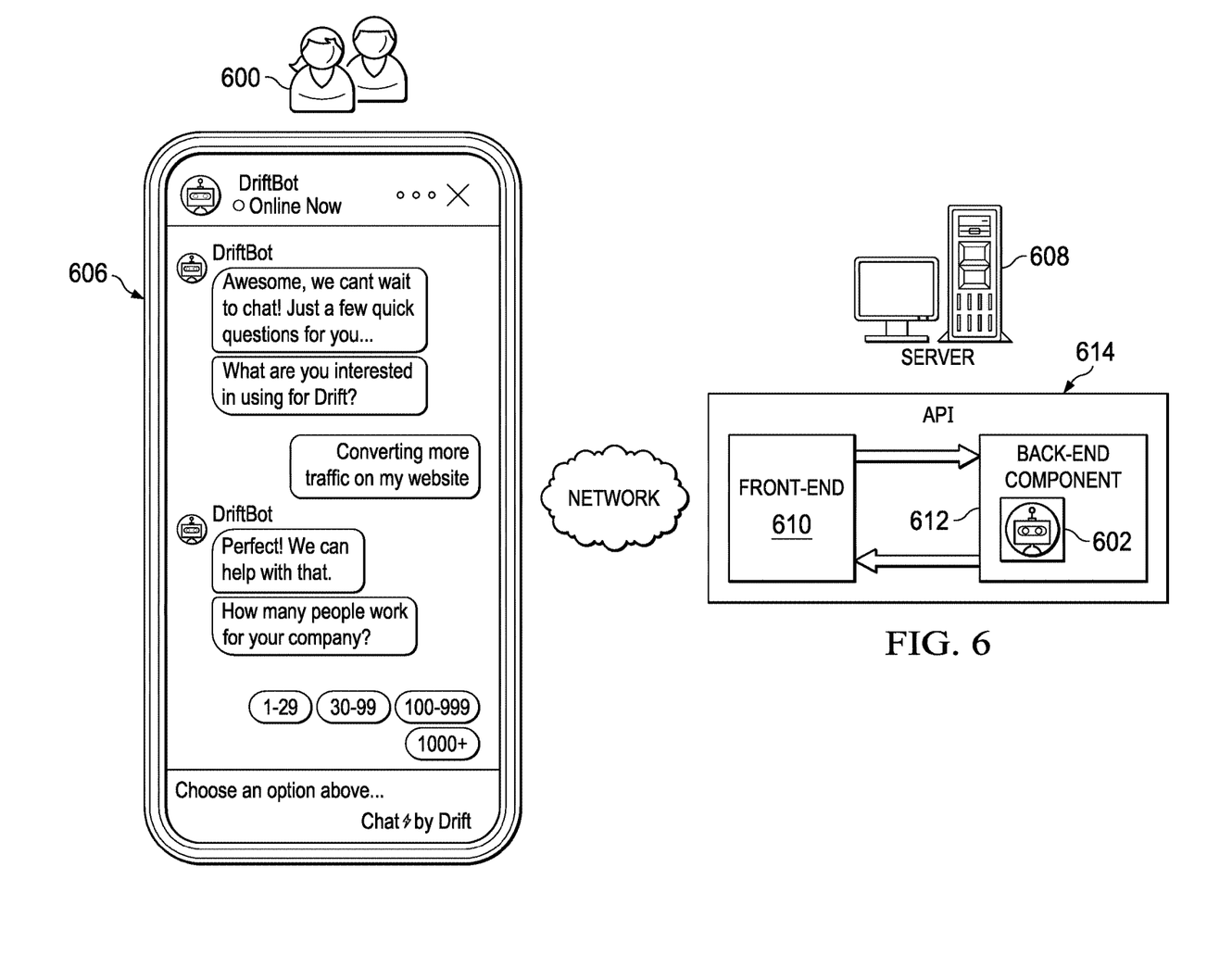
FIG. 6 is a block diagram depicting an information retrieval system in which the technique of this disclosure may be implemented.

Although not intended to be limited, a representative AI-based computing platform on which the above-described multi-channel AI-based conversional is persisted across channels is now described. In particular, FIG. 6 depicts a representative information retrieval system in which the techniques of this disclosure may be implemented. This system may be used to capture human-human conversations, human-bot conversations, and the like.

For example, assume that the system is used to capture human-bot conversations and, in particular, a multi-turn conversation is carried out between an end user 600, and a conversational bot software application 602 that executes in a network-accessible computing platform 604. In this example scenario, the end user 600 is a human being that interacts with the platform, typically using a client machine 606 having a browser or mobile application (app). In a typical user case, the software application 402 executes in association with a website 608, although the chatbot functionality may be utilized by multiple distinct websites operated by separate and independent content providers. As such, the computing platform provides the chatbot functionality in a multi-tenant operating environment, although this is not a requirement. The user provides input to the chatbot as speech, as one or more physical actions (e.g., selecting a button or link, entering data in a field, etc.), or as some combination of speech and physical action. In this example, the chatbot 602 is an AI-based conversational bot. As depicted in FIG. 6, here the platform is configured with a network-accessible front end component 610, together with an Application Programming Interface (API)-accessible back-end system 612. The API is depicted at 614. In this example, the back-end system executes an instance of the software application 602 for each multi-turn conversation and, in particular, it provides both an understanding of a user's query (a speech and/or physical input), as well as a possible response to this query. Typically, the front-end system handles inputs from multiple end users that access the platform, and individual responses as determined by the back-end system (and in particular the software application instance that is managing the particular multi-turn conversation) are passed from the back-end to the front-end for delivery to the end user. In the context of a chatbot, the response typically is provided in a chat window.

During a multi-turn conversation between the user and the conversational bot, the system responds to a user input in less than a given time period (e.g., a few seconds) given network latency and transit time, and that such response is both correct and coherent with respect to the history of the conversation so far, i.e., the history of previous utterances or physical actions by the user. To this end, information against which a query is processed preferably is organized in a particular manner. According to one embodiment, this information is a corpus of historical conversation transcripts that are first annotated (e.g., by human analysts) to provide an information database, e.g., queries and associated responses, that have been generated by the system previously. The nature and scope of the annotations are implementation-specific, but the notion is that the database provides a large corpus of possible conversational flows that the system may then use during a real-time multi-conversation between the user and the chatbot.

Figures 7, 8:
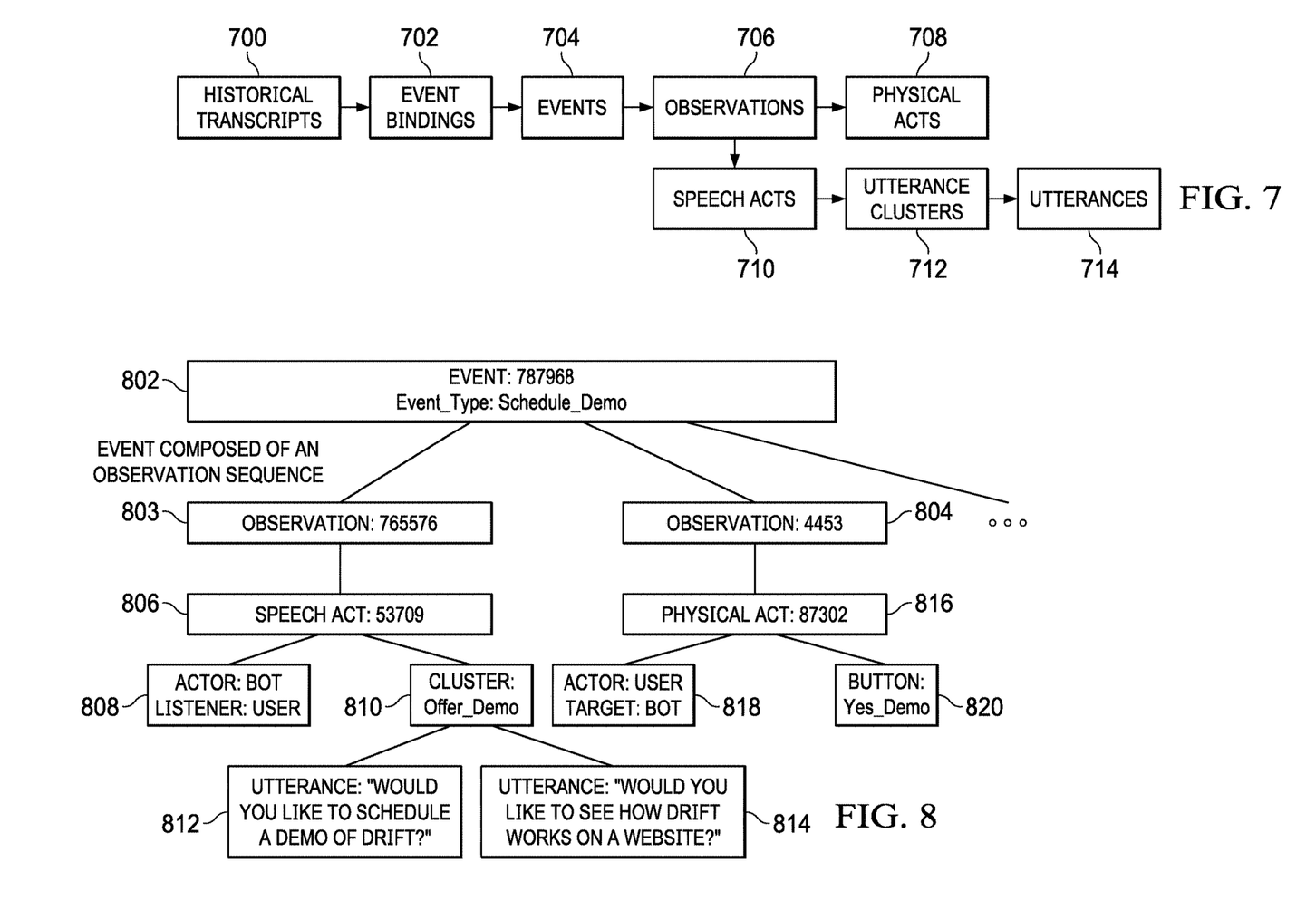
FIG. 7 is a block diagram of a relational database comprising a set of inter-related data tables in which a representative corpus of annotated conversation transcripts is organized to provide storage-efficient informational retrieval to support the techniques herein.
FIG. 8 depicts a representative data model that is persisted in a database and represents a conversational history for a particular conversation or session over one-to-many turns.

As shown in FIG. 7, the conversational transcripts 700 are annotated and then re-organized into a set of inter-related data tables that are structured in a specific manner to enable the system to make fast, discrete comparisons between a live conversation (i.e., a current one) and a corpus of conversions that have been seen in the past (i.e., the annotated historical conversations). This re-organization is sometimes referred to herein as packing. The set of data tables comprises an event bindings table 702, an events table 704, an observations table 706, a physical acts tables 708, and a speech acts table 710. The event bindings 702 table stores a set of event bindings, which are entities that connect lines of transcripts with whatever events these lines have been annotated to represent in the transcript. The events table 704 stores pointers to events, wherein an event typically is composed of a linear sequence of observations that represent an expression of the event. The observations table 706 stores pointers to observations that are either physical acts in the physical acts table 708, or speech acts in the speech acts table 710. As will be described, information in the relational database is searched in response to physical acts or speech acts, and the latter typically are organized as clusters of utterances 712. As defined above, an utterance 714 typically is a grammatically-complete set of words, nominally a complete sentence. Thus, and as depicted, the event bindings (event expressions) point to events, which point to the observations, either physical or speech acts. As will be described, this layout of the relational database enables the system to place an utterance or user action into its appropriate context in a highly-efficient manner, thereby giving the user input meaning within the conversational flow. In particular, the tables allow the system to efficiently search for all instances of an utterance or action (speech or physical act) within the annotated transcripts. Typically, the relational database tables are continually updated as the system interacts with end users; in one embodiment, the data tables are repacked periodically, e.g., every 10-20 minutes, although this is not a requirement.

Efficient querying is facilitated by representing observations as either speech or physical acts, and which are taken by either actor (conversation participants), and that are fluidly intermixed to form events. To this end, and according to a further aspect of this disclosure, as a multi-turn conversation proceeds, the system generates and persists in memory a data model (or, more generally, a data structure) that represents a conversation history between the user and the bot. Generally, the data model comprises an observation history, together with a set of events that have been determined to represent the conversation up to at least one turn. FIG. 8 depicts an example of one such data model. As depicted, event 802 has a particular event identifier "787968," which is an entry in the events table. The event has a particular type, in this example "Schedule_Demo." Based on the conversation so far, the event is composed of a sequence of observations (looking left to right) including an observation 803 (identifier "765576," which is an entry in the observations table), and observation 804 (identifier "4453," which is another entry in the observations table). Observation 802 points to a speech act 606 (identifier "53709," which is an entry in the speech acts table), which speech act in turn is associated to the conversation participants 608, in this case wherein the "actor" is the bot and the "listener" is the user. As also indicated, the speech act 806 has been associated to an utterance cluster 810, in this example the "Offer_Demo." In this example, the utterance cluster is common to utterances 812 and 814 (e.g., "Would you like to schedule a demo?" or "Would you like to see how the app works on a website?). Although just two utterances are depicted for the cluster, there may be any number of utterances. The entities 802, 806, 808, 810, 812 and 814 thus comprise a hierarchical representation of a first observation in the sequence of observations that comprise the event, and this activity is implemented by the chatbot.

More generally, utterances such as described preferably are used as training data for a machine learning (ML)-based statistical classifier; upon training, the classifier is then useful for both checking for exact matches, as well as for further generalization, i.e., finding other wordings that have a similar meaning to words and phrases recognized by the classifier.

Referring back to FIG. 8, and continuing with the example, the second observation 804 represents the user's response to what in this example is a prompt from the bot In particular, the observation 804 is associated with physical act 316 having identifier "87302," which is another entry in the observations data table. In this portion of the tree, conversation participants are reversed, such that in entity 818 the "actor" is the user, and the "target" of the physical act is the bot. As also depicted, physical act 816 also points to a particular button 820, representing the user responding that he or she wants to see the demonstration (the "Yes_Demo" action). The data model continues (on the right) with the next follow-on observation, e.g., an utterance by the user, another physical act, and so forth.

The data model represents each event as being composed of an observation sequence, which typically is a portion of some larger observation history. The observation history is a linear sequence of all observations, and this history is subdivided into events. As noted, events may be interleaved. As the data model is persisted (and in the depicted tree grows right-ward), the conversation history between the user and the bot is represented. In particular, and at any point in the multi-turn conversation, the data model comprises the observation history, namely, a hierarchical set of events that have been determined to represent the conversation up to at least one conversation turn (and typically many turns). More specifically, the data model is the observation history (everything said, and every button clicked, since the beginning of the conversation), and a tree of events that the system has overlaid on top of the observations to represent the system's best guess at explaining how a linear sequence of observations breaks down into coherent fragments of conversation. Persisting a data model that is built in this manner (and based on both utterances and physical actions) provides significant advantages because real conversations do not always unfold neatly into a linear sequence of topics. Instead, often they are typically quite messy, fluidly oscillating between several topics.

The data model keeps track of any number of events, preferably any of which can be actively "extended" at any time. An event can be extended when appending an identified observation creates a new sequence of observations that exactly matches an existing event expression. Thus, an event can be extended if appending the most recent observation creates a new (longer) sequence that exactly matches a sequence in the events table of the relational database. As noted above, the events table against which the matching is attempted is populated during packing, based on human annotation of events found in real human conversation transcripts. When appending an observation to an existing event expression in the data model is not possible, the system determines if it can create a new event with the observation then being the initial observation for the new event sequence. In circumstances when a particular observation does not fall neatly within an event expression (i.e., it cannot be used extend the event), or when the observation does not make sense as a new event, the system then provides a fallback (or failover) operation to enable processing to continue efficiently. This fallback operation is referred to herein as event aliasing.

Event aliasing refers to the notion of inferring which event is unfolding, or has unfolded, with an inexact match. In particular, when an exact sequence is not recognized, preferably a closest inexact match is determined and presented as an alias such that further processing can then be performed as if the closest inexact match was recognized as a known sequence. When an aliased event is created, the system then proceeds to process the alias event as the event being spoofed (and thus no longer sees the inexact match). Aliasing may be carried out either to extend an event (an "aliased extension"), or even to create a new event ("aliasing a new event"). Preferably, the system first tries to extend an event (using an exact match); then, if extending an event fails, the system then determines if it can create a new event (if this can be done logically given the conversation history so far). Once the latter option fails, the system fails over to attempt to generate an aliased extension and, failing that, performs aliasing for a new event. Event aliasing is advantageous, as it enables the system to provide coherent and appropriate responses even when the database lookup does not return exact (or otherwise useful) results. The mechanism enables the system to pretend it has seen a sequence of observations that exactly matches something in the database, when in reality the system observed something very similar but that, e.g. skips an utterance in the middle, re-orders two utterances within the sequence, or the like. Event aliasing enables to system to operate coherently even when there is no exact match for a sequence that can be extended with the most recent observation. In this manner, the sequence is auto-corrected to something that is close enough to what has been observed. This approach ensures that the rest of the system functions efficiently with exact look-ups into tables within the relational database.

The intelligent packing of the relational database, and the use of the data model structured as described, enables the system to participate in a multi-turn conversation, coherently, and quickly. The system has several options for flexibly understanding the meaning of an utterance, where aliasing is the fallback, and where meaning is ascribed based on which observation is seen at which step of an event, within a sequence of events that compose a conversation. Events are of arbitrary length, and they can overlap in time with other events. Thus, and although not depicted in the example event hierarchical representation shown in FIG. 8, multiple events may be active concurrently.

In this example depicted in FIG. 8, two different utterances are indicated as being members of an utterance cluster. Preferably, and mentioned above, the system defines utterance clusters by training a machine learning (ML) classifier.

Figure 9:
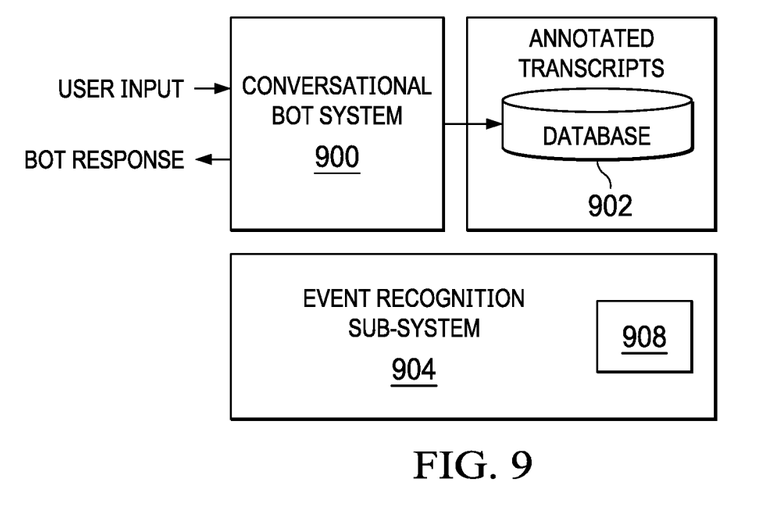
FIG. 9 depicts a representative system interaction showing processing of a user query.

A conversational bot system 900 is shown in FIG. 9. The system is configured to process a query (e.g., a user utterance or physical act) within a given turn of the multi-turn conversation. It assumes that the corpus of annotated conversation transcripts is packed into a relational database 902 comprising the set of inter-related tables as shown in FIG. 7. As noted, preferably these tables include a table of events, a table of observations, a table of physical acts, and a table of speech acts. As will be described, the relational structure includes the pointers (keys) identified, and preferably lookups in to the database are performed on a constant-time basis such that only a single database query into the data structures is required for each database access (although there are typically several of such accesses as will be described).

At a high level, the system 900 comprises several main components including an event recognition sub-system 904. The event recognition sub-system 904 has several basic functions. Initially, and upon receipt of a new user input, the event recognition sub-system 904 tries to decide how to interpret what was actually said to the bot given what has been observed previously. Typically, an input can be successfully interpreted if two conditions are met: (1) the user's input can be recognized as a speech act or physical act that exists as an observation in the historical data, and (2) this observation can legally extend an event or start a new event, giving contextual meaning to the observation.

As noted above, event recognition is the process of first trying to extend an event, or adding a new event, or (failing those options) performing aliasing. In general, this evaluation is carried out using an initial lookup into the database of historical transcripts to identify one or more candidate interpretations, followed by a filtering of the candidates for coherency (sometimes referred to herein as "coherency filtering"). More formally, a candidate interpretation typically corresponds to some human annotation found in the historical conversation transcripts that were indexed during the packing operation. In one exemplary implementation, the candidate interpretation is a pointer identifying specific lines of historical data in the set of inter-related tables that comprise that relational database. Another way of describing a candidate interpretation is as an instance of observations, e.g., one candidate interpretation might be a specific utterance in a specific transcript that expresses the speech act "hello" with the line "hey man nice to see you." Multiple candidate interpretations are identified by a set of pointers to specific lines in the transcripts, representing instances of observations.

Preferably, the input to event recognition sub-system 904, where the system tries to extend an event, etc., is represented as a sequence of observation identifiers (IDs), rather than instances. An ID is akin to a type of observation that may appear many times in the annotated historical data, rather than one instance of an observation with that ID. To take a concrete example, assume the user utterance is "hello kind sir." The classifier is run against the utterance, and in this example the classifier assigns the utterance the speech act label "hello." From this, the system looks up a speech act ID (for this label) from the speech acts table. Then, from this speech act ID, the system looks up an associated observation ID in the observations table. These lookups typically are done at once, through SQL table joins. After determining what observation ID "hello kind sir" maps to, the system tries to use this observation ID to first extend an event. To this end, preferably the data model is updated to reflect that the event is extended (at this point, merely an assumption that the event can be extended), and it is the resulting modified event that the system then uses to perform the initial lookup described above, namely, to fetch the one or more candidate interpretations. These candidate interpretations are instances of observations with the observation ID previously mentioned, e.g., where the system found things like "hello."

In addition to obtaining the one or more candidate interpretations, the event recognition sub-system 904 evaluates the candidate interpretations that it fetches, with the goal of identifying one candidate interpretation that it will then provide to update the data model. In this initial pass, the event recognition sub-system 904 functions to attempt to understand the user's input. A mechanism 908 for performing this function preferably comprises a set of evaluation agents that are sometimes referred to herein as "critics." Critics preferably operate over candidate interpretations. As used herein, a critic typically is a software agent (e.g., implemented as a Python class) that evaluates a candidate interpretation against a statistical model, a set of hard-coded rules, or some other data or criteria, in each case to determine whether the candidate interpretation should be used to potentially update the data model. Preferably, there are a plurality of separate and distinct "critics," with each critic providing a particular type of analysis, and a particular candidate interpretation must pass each and every critic. In other words, preferably the critics collectively provide a Boolean AND function such that a candidate interpretation is not accepted for use to update the data model unless all critics are satisfied. Although this approach is preferred, the all-or-nothing criteria may be relaxed. The nature and processing performed by a critic may vary from computationally-simple tasks (e.g., evaluation of business logic), to more complex evaluation tasks (e.g., evaluation against a statistical model). The critics may be arranged sequentially, such that the more computationally-simple tasks are tested before the more complex ones. Critics may also operate in parallel with one another, and one or more critics may be combined into a single critic. In this manner, the critics selectively filter the candidate interpretations so as to ensure that the bot operates coherently and consistently given the conversation so far.

As noted above, event recognition tries to extend an event if it can do so. To this end, and as part of the event recognition function, the critics are executed against the set of candidate interpretations. If this initial pass through the critics returns a positive result, work of the event recognition sub-system is done (for this first pass), as the sub-system has recognized the user's input. If, however, the initial pass through the critics returns empty-handed (i.e., no candidate interpretation survives), then the event recognition sub-system tries to assign a new event. The new event is a new instance of an event that will initially have only one observation in it, namely, a candidate interpretation that makes it through the critics. To this end, a second pass through the critics is performed. This second pass may or may not identify a candidate interpretation. If a candidate interpretation passes the critics, it is used for the new event. If, however, evaluation of the new event also returns empty-handed (i.e., no candidate interpretation logically starts a new event), the routine then continues by moving on to event aliasing. As noted above, first the system tries an aliased event, where the system allows an aliased addition, namely, where a new instance of an event is started at a position in the conversation where the system has not seen (in the historical data) that kind (label) of event start. Once again, the critics are run again in an attempt to find a candidate interpretation. Processing efficiencies are provided by caching results of the critic evaluations where possible. The result of this iterative process (trying first to extend an event, or start a new event, or aliasing an event, etc.) is a given candidate interpretation.

To this end, the given candidate interpretation identified by the event recognition sub-system is applied to the data model to produce an adjusted data model. As used herein, adjusting the data model may involve an addition to the data model, or not rolling back a change (which typically occurs when a candidate interpretation is rejected by a critic).

Critics may be the same or distinct software agents. By way of example, the following agents may be used for event recognition:

CriticStaleExtension—after some number of conversational turns have passed, it becomes unlikely that something someone just said is supposed to be interpreted as an extension of something said long ago in the conversation. This critic rejects an interpretation that tries to extend an event that has not changed in the recent several turns.

CriticExtendedEventTypeChange—sometimes extending an event with one more observation changes the label (and thus the meaning) of that event. The system needs to be careful about allowing a semantic shift like this. If the original event was not an alias, and changing the event label leaves it in a position in the conversation history where this ordering of events has not been observed, then the label change (via the event extension) that would lead to this unfamiliar ordering of events is not allowed.

The above example agents are not intended to be limiting.

The above description of event recognition is not necessarily required to occur within a particular active conversation.

Typically, the computing platform is managed and operated "as-a-service" by a service provider entity. In one embodiment, the platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid.

The system may be implemented on-premises (e.g., in an enterprise network), in a cloud computing environment, or in a hybrid infrastructure. An individual end user typically accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront. The platform may be managed and operated by a service provider. Although typically the platform is network-accessible, e.g., via the publicly-routed Internet, the computing system may be implemented in a standalone or on-premises manner. In addition, one or more of the identified components may interoperate with some other enterprise computing system or application.

Preferably, the platform supports a machine learning system. The nature and type of Machine Learning (ML) algorithms that are used to process the query may vary. As is known, ML algorithms iteratively learn from the data, thus allowing the system to find hidden insights without being explicitly programmed where to look. ML tasks are typically classified into various categories depending on the nature of the learning signal or feedback available to a learning system, namely supervised learning, unsupervised learning, and reinforcement learning. In supervised learning, the algorithm trains on labeled historic data and learns general rules that map input to output/target. The discovery of relationships between the input variables and the label/target variable in supervised learning is done with a training set, and the system learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, linear regression, logistic regression, naive Bayes, and neural networks. As will be described, the techniques herein preferably leverage one or more neural networks. Formally, a NN is a function g: $X \rightarrow Y$, where X is an input space, and Y is an output space representing a categorical set in a classification setting (or a real number in a regression setting). For a sample x that is an element of X, $g(x)=f_L(f_{L-1}(\ldots(x))))$. Each $f_i$ represents a layer, and $f_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

Thus, for example, in one embodiment, and without limitation, a neural network such as described is used to extract features from an utterance, with those extracted features then being used to train a Support Vector Machine (SVM).

In unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

The following provides additional details regarding supervised machine learning. As noted above, supervised learning is the machine learning task of inferring a function from labeled training data. The training data consist of a set of training examples. In supervised learning, typically each example is a pair consisting of an input object (typically a vector), and a desired output value (also called the supervisory signal). A supervised learning algorithm analyzes the training data and produces an inferred function, which can be used for mapping new examples. An optimal scenario allows for the algorithm to correctly determine the class labels for unseen instances. This requires the learning algorithm to generalize reasonably from the training data to unseen situations.

For supervised learning, the following steps are used. An initial determination is what kind of data is to be used as a training set. The training set is then gathered. In particular, a set of input objects is gathered and corresponding outputs are also gathered, either from human experts or from measurements. Then, an input feature representation of the learned function is determined. In this approach, typically the input object is transformed into a feature vector, which contains a number of features that are descriptive of the object. The structure of the learned function and corresponding learning algorithm are then determined. For example, support vector machines or decision trees may be used. The learning algorithm is then run on the gathered training set. Some supervised learning algorithms require a user to determine certain control parameters. These parameters may be adjusted by optimizing performance on a subset (called a validation set) of the training set, or via cross-validation. The accuracy of the learned function is then evaluated. After parameter adjustment and learning, the performance of the resulting function is measured on a test set that is separate from the training set.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Other enabling technologies for the machine learning algorithms include, without limitation, vector autoregressive modeling (e.g., Autoregressive Integrated Moving Average (ARIMA)), state space modeling (e.g., using a Kalman filter), a Hidden Markov Model (HMM), recurrent neural network (RNN) modeling, RNN with long short-term memory (LSTM), Random Forests, Generalized Linear Models, Extreme Gradient Boosting, Extreme Random Trees, and others. By applying these modeling techniques, new types of features are extracted, e.g., as follows: model parameters (e.g. coefficients for dynamics, noise variance, etc.), latent states, and predicted values for a next couple of observation periods.

Typically, but without limitation, a client device is a mobile device, such as a smartphone, tablet, or wearable computing device, laptop or desktop. A typical mobile device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Each above-described process preferably is implemented in computer software as a set of program instructions executable in one or more processors, as a special-purpose machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Each above-described process preferably is implemented in computer software as a set of program instructions executable in one or more processors, as a special-purpose machine.

The techniques herein generally provide for the above-described improvements to a technology or technical field, as well as the specific technological improvements to various fields, all as described above.

What is claimed is as follows:

1. A method for imitating a human conversational response across multiple channels, comprising:
    associating a multi-turn conversational bot with one or more of the multiple channels;
    providing a data model uniquely associated with a multi-turn conversation via the multi-turn conversational bot, the multi-turn conversation being between an actor and the multi-turn conversational bot, the data model comprising a linear sequence of observations, wherein an observation is an atomic speech or physical action taken by the actor, the data model also including a set of one or more events that have been determined to represent a meaning of the conversation history since the multi-turn conversation begins, wherein each event is composed of a sequence of observations and is determined based on a closest exact or inexact match to event annotations overlaid onto conversational fragments in a set of historic conversational transcripts, wherein an inexact match is associated with an aliased event having an event expression that is an approximate match to an existing event;
    augmenting each observation in the sequence of observations to include an identification of a channel in which the observation originates;
    as one or more turns are added to the multi-turn conversation, persisting a conversational context across multiple channels using the augmented observations in the data model; and
    adapting a particular response or action provided to an end user based on the channel currently in use for a particular turn.

2. The method as described in claim 1 wherein persisting the conversational context includes transitioning the multi-turn conversation from at least a first channel to a second channel.

3. The method as described in claim 2 wherein the channels are one of: chat, messaging, email, voice, and a communication initiated by a third party.

4. The method as described in claim 2 further including setting a value of an attribute during a first turn that occurs in the first channel, and using the value during a second turn that occurs in the second channel without prompting again for re-entry of the value.

5. The method as described in claim 1 wherein respective turns in the multi-turn conversation are associated with distinct end user sessions.

6. The method as described in claim 2 wherein the multi-turn conversation transitions from the first channel to the second channel in response to an action initiated by the end user or as a result of activity associated with a process.

7. The method as described in claim 1 wherein the multi-turn conversation is associated with a particular end user.

8. The method as described in claim 1 wherein providing the data model further includes:
receiving an input that includes an attribute; and
responsive to receipt of the input, retrieving the data model from a set of saved data models when a value of the attribute is recognized as being present in the data model.

9. The method as described in claim 1 wherein the multi-turn conversation is associated with a conversation initiated between a first and second human end user.

10. A software-as-a-service computing platform, comprising:
computing hardware;
computer software executing on the computer hardware, the computer software comprising computer program instructions executed on the computing hardware and configured to imitate a human conversational response across multiple channels, the computer program instructions configured to:
associate a multi-turn conversational bot with one or more of the multiple channels;
provide a data model uniquely associated with a multi-turn conversation, the multi-turn conversation being between an actor and the multi-turn conversational bot, the data model comprising a linear sequence of observations, wherein an observation is an atomic speech or physical action taken by the actor, the data model also including a set of one or more events that have been determined to represent a meaning of the conversation history since the multi-turn conversation begins, wherein each event is composed of a sequence of observations and is determined based on a closest exact or inexact match to event annotations overlaid onto conversational fragments in a set of historic conversational transcripts, wherein an inexact match is associated with an aliased event having an event expression that is an approximate match to an existing event;
augment each observation in the sequence of observations to include an identification of a channel in which the observation originates;
as one or more turns are added to the multi-turn conversation, persist a conversational context across multiple channels using the augmented observations in the data model; and
adapt a particular response or action provided to an end user based on the channel currently in use for a particular turn.

11. The computing platform as described in claim 10 wherein computer program instructions that persist the conversational context further include computer program instructions configured to transition the multi-turn conversation from at least a first channel to a second channel.

12. The computing platform as described in claim 11 wherein the set of input and output channels are one of: chat, messaging, email, voice, and a communication initiated by a third party.

13. The computing platform as described in claim 11 wherein the computer program instructions further include computer program instructions configured to:
set a value of an attribute during a first turn that occurs in the first channel; and
use the value during a second turn that occurs in the second channel without prompting again for re-entry of the value.

14. The computing platform as described in claim 10 wherein respective turns in the multi-turn conversation are associated with distinct end user sessions.

15. The computing platform as described in claim 11 wherein the multi-turn conversation transitions from the first channel to the second channel in response to an action initiated by the end user or as a result of activity associated with a process.

16. The computing platform as described in claim 10 wherein the multi-turn conversation is associated with a particular end user.

17. The computing platform as described in claim 10 wherein the computer program instructions configured to provide the data model further include computer program instructions configured to:
receive an input that includes an attribute; and
responsive to receipt of the input, retrieve the data model from a set of saved data models when a value of the attribute is recognized as being present in the data model.

* * * * *